United States Patent [19]
Winnie et al.

[11] Patent Number: 5,482,073
[45] Date of Patent: Jan. 9, 1996

[54] METHOD OF CHANGING OUT GAS METERS

[75] Inventors: Harold R. Winnie, Kansas City; Ronald D. Bridgewater, Lee's Summit; Robert K. Kitterman, Kearney, all of Mo.

[73] Assignee: R. W. Lyall & Company, Inc., Corona, Calif.

[21] Appl. No.: 462,697

[22] Filed: Jun. 5, 1995

Related U.S. Application Data

[62] Division of Ser. No. 337,768, Nov. 14, 1994, Pat. No. 5,437,300.

[51] Int. Cl.⁶ .................................................. G01F 15/00
[52] U.S. Cl. ............................................................ 137/15
[58] Field of Search .............................. 137/15, 112, 113; 73/201

[56] References Cited

U.S. PATENT DOCUMENTS 2,579,656  12/1951  Douglas et al. .
3,148,690   9/1964  Petersen .
3,187,570   6/1965  Mueller .
3,245,257   4/1966  Anderson .
3,272,219   9/1966  Frantz .................................... 137/112
3,296,861   1/1967  Mueller et al. .
3,444,724   5/1969  Gilpin .
4,293,147  10/1981  Metcalfe et al. .
5,042,528   8/1991  England et al. .
5,178,188   1/1993  Russell .
5,287,886   2/1994  Russell .

Primary Examiner—Robert G. Nilson
Attorney, Agent, or Firm—Fulwider, Patton, Lee & Utecht

[57] ABSTRACT

A method of providing a continuous supply of gas to the gas utilities of a residential or commercial building while the gas meter is disconnected from the gas service lines. The method employs a bypass valve comprising a tubular fitting to be connected in line with the gas service line conducting gas from the gas meter to such building. An auxiliary source of gas may be coupled with an auxiliary port formed on the outer wall of the fitting, such that activation of the auxiliary source acts to drive a poppet through the bypass valve to seal off the gas meter from the gas service lines. Thus the gas meter may be disconnected from such gas service lines, as the auxiliary source will provide continuous gas supply to the utilities of the building.

12 Claims, 2 Drawing Sheets

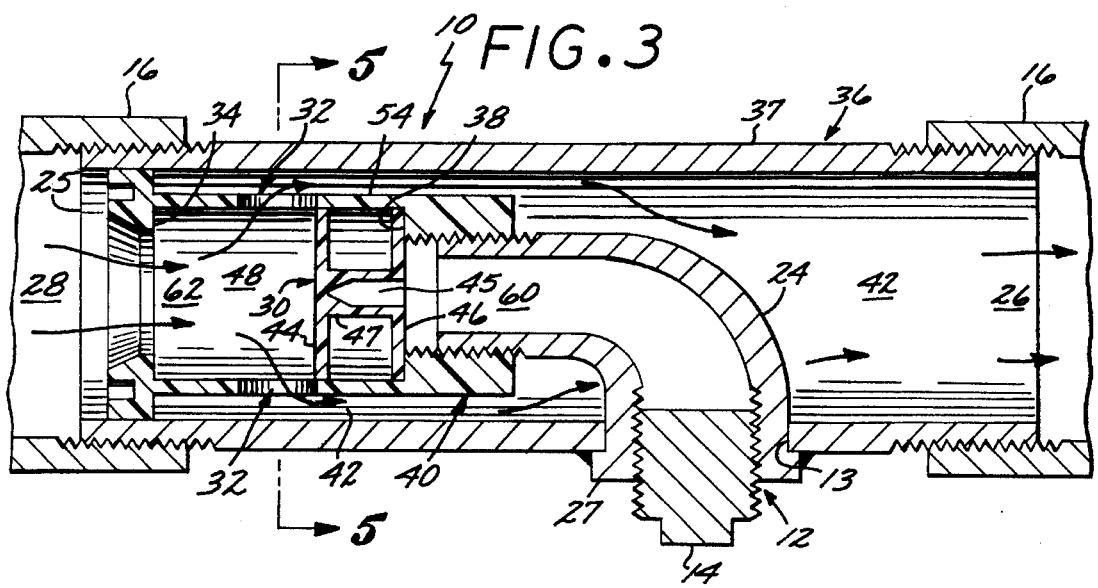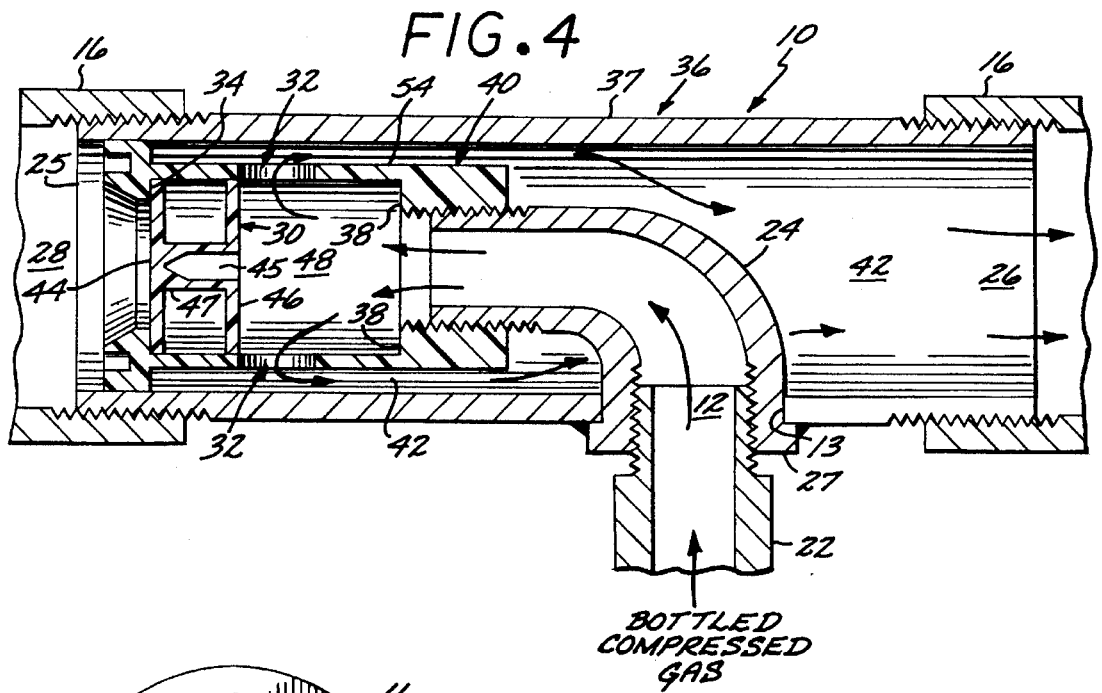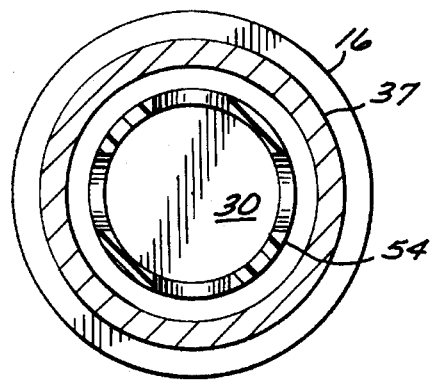

METHOD OF CHANGING OUT GAS METERS

This application is a divisional of application Ser. No. 08/337,768 filed Nov. 14, 1994 and now U.S. Pat. No. 5,437,300.

BACKGROUND OF THE INVENTION

1. Field of the Invention

The subject invention relates to gas meters utilized to meter the gas supplied to gas powered utilities and, more particularly, to a method of providing uninterrupted gas service to the gas utilities of a residential or commercial building while the corresponding gas meter is serviced or replaced.

2. Description of the Prior Art

Gas meters are installed in utility gas lines leading to the gas tubing which serve to distribute gas to various utilities employed in a residential or commercial establishment. Such gas meters must be, from time to time, repaired or replaced. Government regulations dictate that such gas meters be changed out periodically, regardless of their performance. The typical service life dictated for such meter change outs typically ranges from ten to fifteen years.

These gas meter change-outs have posed a longstanding problem for gas companies in that such change-outs require the gas meter to be disconnected from the gas service line leading to, for example, the appliances in a residence. This disconnection results in temporary interruption of the gas flow to the corresponding residence causing the pilot lights in those gas appliances relying on such gas for igniting the main burner to be extinguished. Normal procedure then requires a skilled gas company employee to, after repair or replacement of the meter is completed, gain entrance to the residence, check for gas leaks, and manually relight all of the pilot lights. There is therefore a need to provide a continuous gas supply to, for instance, residential appliances while the gas meter is disconnected from the gas service line and serviced.

A number of methods have been proposed in attempt to provide uninterrupted flow of gas to residential appliances while the corresponding gas meter is being serviced. However, the prior art methods all suffer some disadvantage. One such method, described in U.S. Pat. No. 3,148,690, commonly referred to as the Grunsky method, employs a plastic bag to be fitted over a tee connecting the meter to the gas service line conducting gas to the utilities of the residence. A plug in the uncoupled end of the tee must be removed, and an external cylinder manipulated through the bag to be coupled with the exposed port of the tee in order to allow for the communication of gas from an external gas source to the gas service line. This method has proven to be time-consuming, painstaking, and expensive.

Another proposed method involves accessing the uncoupled end of a tee and manually driving a seal through the tee to seat against the end of the tee coupled to the gas meter thereby sealing off the gas meter, while providing auxiliary gas from an external gas source to be communicated through the uncoupled end of the tee. This method is time consuming and allows for momentary gas escape when the uncoupled end of the tee is initially unplugged thus resulting in a temporary lapse in gas supply to the appliances, an event which will serve to extinguish the associated pilot lights.

Yet another prior method is described in U.S. Pat. No. 5,178,188, in which a sleeve having a side port formed thereon is placed vertically in-line with the gas service line on the customer's side of the gas meter. Disposed within the sleeve adjacent the lower end is a ball check valve housing a floating ball. Thus, when gas is flowing into the lower end of the sleeve, the ball is repelled from a lower seat and gas will flow around the ball and downstream to the appliances in the corresponding residence. An external source may be connected to the side port to inject gas into the sleeve and the gas meter supply shut off allowing the ball to, under the influence of gravity, fall downward and seal the lower seat to block flow to the gas meter while opening communication from the external source to the appliances so the gas meter may be disconnected from the gas service line. This method has several limitations, however. In the first place, the sleeve must be situated in a vertical orientation in order to function properly, due to the fact that it requires gravity in order to direct the ball, when falling under the influence of gravity, onto the lower seat. Secondly, the ball is driven into repeated contact with the walls of the ball check valve which, over time, will cause wear and alter its shape to thus detract from its effectiveness in sealing the lower seat. Such wear and consequent deformation will require replacement of either the ball or of the entire sleeve thus requiring gas flow to be interrupted, which is the exact problem such a device is implemented to alleviate. Also, the sleeve incorporates a separate mechanism to block gas flow which enters the lower end from flowing radially out of the side port. This device incorporates an external plug to seal against flow out the side port. This method thus employs a device presenting the added risk attendant the fact that this plug is typically accessible externally by unauthorized individuals to access the gas to be stolen from gas service lines.

As such, it may be appreciated that there continues to be a need for a method which allows for the disconnection of the gas meter from the gas service line leading to the corresponding residence without interrupting the gas flow to the residence, and which furthermore is efficient and simple to practice. The instant invention addresses such needs.

SUMMARY OF THE INVENTION

Briefly, and in general terms, the present invention is directed to a method which allows for a gas meter to be replaced or serviced while the utilities in the corresponding residential or commercial building continue to receive a supply of gas. The method of the present invention employs a bypass valve to be connected in-line with the gas service line leading to the gas distribution lines in such building. In accordance with the invention, the bypass valve includes an in-line tubular fitting formed with an interior flow chamber to accommodate, during normal operation, gas flow from a gas meter to the gas distribution lines of the corresponding building. The bypass valve may be installed in a gas service line downstream of the gas meter. An auxiliary source of gas is provided and may be releasably coupled to an auxiliary port machined through the side wall of the fitting, the port leading to an auxiliary inlet end of an open ended, generally cylindrical poppet cage concentrically affixed in the interior flow chamber of the pipe. The other end of the poppet cage terminates adjacent the upstream flow inlet end of the pipe and defines a primary gas inlet. The poppet cage includes ports machined in the side walls thereof which define cage outlets for gas contained in the poppet cage. Initiation of the auxiliary gas flow serves to drive a spool shaped poppet floatably housed in the poppet cage past the cage outlets toward the primary gas inlet to seal the primary inlet. Auxiliary gas then flows radially out through the cage outlets and downstream to the appliances of the residence. The gas meter may then be disconnected from the gas service lines without any interruption of the gas flow to the building.

Other features and advantages of the invention will become apparent from the following detailed description, taken in conjunction with the accompanying drawings which illustrate, by way of example, the features of the invention.

DESCRIPTION OF THE DRAWINGS

FIG. 3 is a partial longitudinal sectional view, in enlarged scale, taken along the line 3—3 of FIG. 1;

FIG. 4 is a partial longitudinal sectional view, in enlarged scale, taken along the line 4—4 of FIG. 2; and FIG. 5 is a transverse sectional view taken along the line 5—5 of FIG. 3.

DETAILED DESCRIPTION OF THE PREFERRED EMBODIMENT

Figure 1:
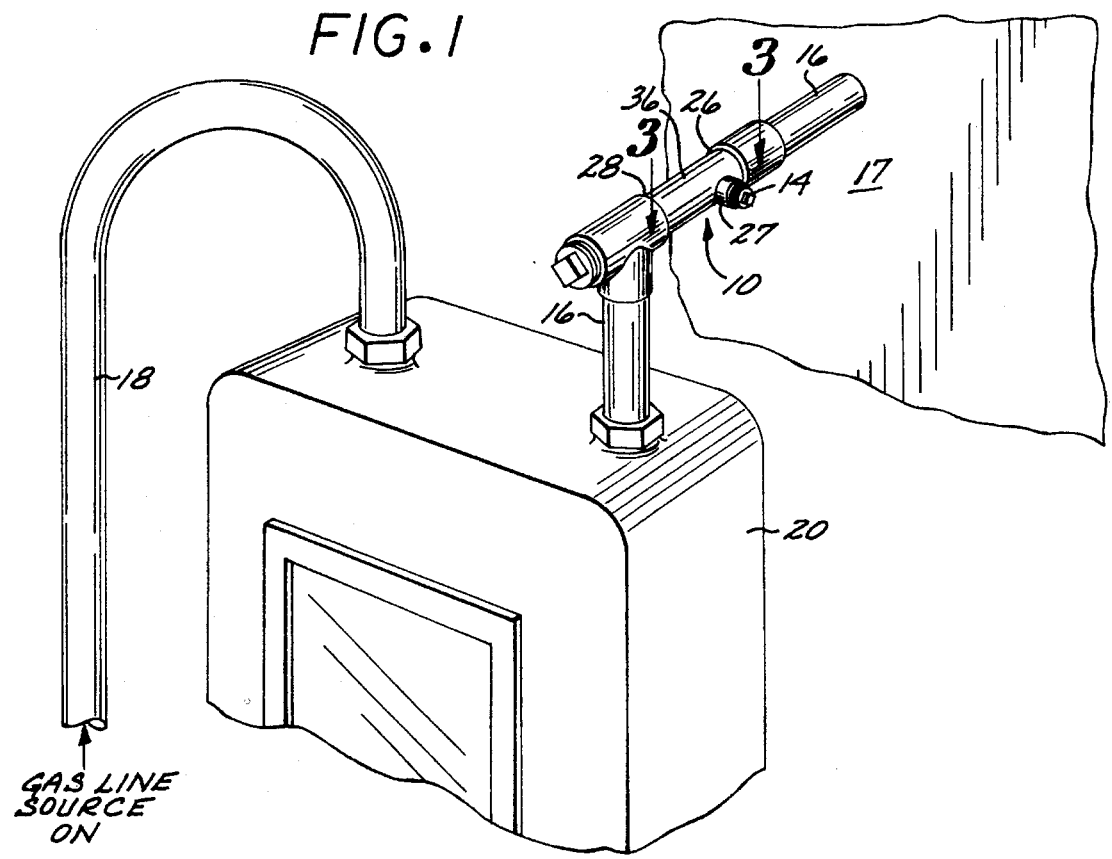
FIG. 1 is a perspective view of a bypass valve employed in the method of the present invention connected in series with a gas service line leading to gas distribution lines in a residence.
Figure 2:
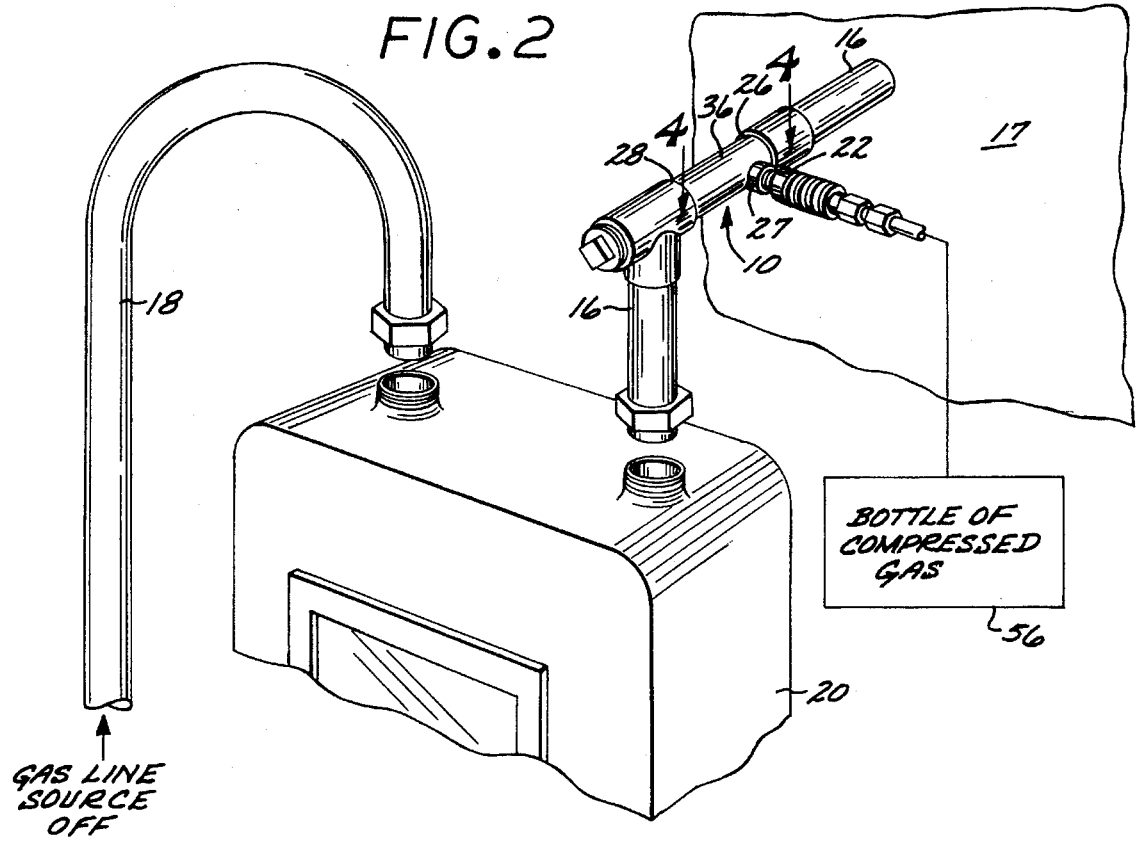
FIG. 2 is a perspective view similar to FIG. 1 but showing an auxiliary gas supply coupled to the bypass valve and the gas meter disconnected from the gas service line.

In the following detailed description, like reference numerals will be used to refer to like or corresponding elements in the different figures of the drawings. Referring now to the drawings, and particularly to FIG. 1, there is shown generally a bypass valve 10 which may be employed in the present invention connected in-line with a gas service line 16 leading from a gas meter 20 to the gas distribution lines of a corresponding residential or commercial building 17. Referring to FIG. 3, the bypass valve includes an open ended elongated pipe 36 having an externally threaded upstream flow inlet end 28 and an externally threaded downstream flow outlet end 26, such pipe defining an interior flow chamber 42. An auxiliary port 13 is formed in the side wall of the pipe to provide access to the gas service line for an auxiliary gas source 56 (FIG. 2). A generally cylindrical spool poppet cage 40 defining a poppet chamber 48 therein is mounted concentrically inside the pipe and terminates at its upstream end in a circular primary inlet 62 and at its downstream end in an internally threaded nipple defining an auxiliary inlet 60 (FIGS. 3 and 4). The outside diameter of the poppet cage is smaller than the inner inside diameter of the pipe 36 to thereby cooperate in defining an annular flow chamber around such poppet cage. The annular wall 54 of such poppet cage is formed with a number of radial outlet ports defining cage outlets 32 to accommodate radial outward flow of gas from the poppet cage.

An auxiliary elbow fitting 24 is disposed in the pipe 36 and is externally threaded at its reduced upstream end to be axially aligned with and thereby connected to the nipple at the downstream end of the cage (FIGS. 3 and 4). The elbow fitting then expands and turns radially outwardly to be received in the auxiliary inlet port 13 thereby allowing for the communication of gas between the auxiliary port and the auxiliary inlet.

A spool shaped poppet, generally designated 30, comprises a cylindrical center body 47 terminating at its respective longitudinal ends in a pair of enlarged disks 44 and 46 (FIGS. 3 and 4). The disks serve to make a close fit within the poppet cage 40. Thus when gas from the gas meter 20 enters the poppet cage through the primary inlet 62, the poppet is floatably driven toward and seats to seal the auxiliary inlet 60. This allows the gas to flow radially out through the cage outlets 32 and downstream through the annular flow chamber 42 and downstream flow outlet 26 to the appliances of the residence (FIG. 3). Further, when the auxiliary gas source 56 is connected to the auxiliary port 13 and gas flow from such source is commenced, auxiliary gas is injected through the auxiliary fitting 24 and flows upstream to the auxiliary inlet 60. Such auxiliary gas drives the poppet upstream toward and seats to seal the primary inlet 62 (FIG. 4). The auxiliary gas will then flow radially out through the cage outlets 32 and downstream through the annular flow chamber and out through the downstream flow outlet 26 to the gas utilities of the residence. The gas meter may then be disconnected from the gas service line without interruption of gas flow to the appliances and consequent loss of flame.

The elongated pipe 36, in the preferred embodiment, is formed of malleable iron and has a generally cylindrical configuration. The pipe is formed with a cross sectional diameter approximately equivalent to that of conventional pipe sizes to allow for a similar amount of gas to flow through the flow chamber 42 as that which conventionally flows through the gas service line 16. The pipe is externally threaded at the upstream flow inlet and downstream flow outlet, 28 and 26, respectively, to allow for engagement with the internally threaded ends of the gas service line 16 (FIGS. 3 and 4).

The auxiliary fitting 24 is embodied as an elbow and may be constructed of malleable iron. The auxiliary fitting is generally disposed within the flow chamber and has one end projecting outwardly through the auxiliary port 13 (FIG. 3), such end terminating in an internally threaded flange 27 which seats on the exterior surface of the pipe side wall. The upstream end of the auxiliary fitting is externally threaded and engages the internally threaded auxiliary inlet 60. As such the auxiliary fitting and auxiliary inlet cooperate to define an auxiliary gas flow path from the auxiliary port upstream into the poppet chamber 48. The flange is threadably coupled with either a threaded plug 14 (FIG. 3) to seal the auxiliary port during normal operation of the gas meter, or with a threaded coupling 22 leading to an auxiliary gas source 56 (FIG. 4) to introduce auxiliary gas into the poppet chamber.

The poppet cage 40, in the preferred embodiment, is formed of a plastic, such as Solvay K38, and is maintained in suspended position within the elongated pipe 36 by means of an enlarged annular mounting ring 25 formed at the upstream end of the poppet cage and mounted internally in such pipe adjacent the flow inlet end 28. Such annular mounting ring includes a generally frusto conical central passage and terminates on its downstream side in an annular auxiliary seat 34 having a central inlet opening with a diameter smaller than the diameter of the poppet 30 which serves to maintain the poppet within the poppet chamber 48. The mounting ring, central passage, and poppet cage cooperate to direct the gas entering the bypass valve through the upstream flow inlet 28 to flow through the central passage and into the poppet chamber 48.

The poppet 30 is constructed of a plastic in the preferred embodiment, such as Solvay K38. The first enlarged disk 44 defines a primary inlet disk and the second enlarged disk 46 defines an auxiliary inlet disk. The auxiliary inlet disk is further formed with a lightening bore 45 formed centrally therein to project from one side of the center body nearly through to, but short of, the other side, thereby effectively decreasing the mass of the poppet such that the gas pressure required to drive the poppet through the poppet cage is proportionally reduced. The typical gas pressure in the gas service line on the customer's side of the gas meter is on the order of 0.25–5 psi. The poppet is formed having a sufficiently small mass such that gas pressures on the order of 0.25–5 psi are sufficient to drive the poppet through the poppet cage regardless of the relative orientation of the bypass valve.

The internally threaded nipple coupled at the downstream end of the poppet cage 40 with the externally threaded end of the auxiliary fitting 24 is formed at its upstream edge with an upstream facing annular flow seat 38 configured with a sufficiently small opening such that the auxiliary inlet disk 46 of the poppet 30 stops and seats thereagainst (FIG. 3).

The cage outlets 32 are formed in the arcuate poppet cage side wall 54 and, in the preferred embodiment, have a circular configuration but may also be formed with a square, rectangular or any such configuration. The cage outlets are disposed in an annular, spaced apart configuration at a predetermined position on the poppet cage side wall such that the cage outlets are completely exposed when the poppet 30 is driven to either end of the poppet chamber 48. The cage outlets are formed with sufficiently large composite cross sectional areas such that the rate of gas flow toward the residence or commercial building is not impeded.

The bypass valve 10 employed in the method of the present invention will operate regardless of its relative orientation, whether horizontal or vertical. The poppet does not rely on gravity to seal either the primary inlet or the auxiliary inlet but rather is driven to seal the respective inlets by the application of a gas pressure differential present within the poppet chamber. As such, the bypass valve may be connected in-line with the gas service line in either a horizontal section of the gas service line or in a vertical section thereof.

The bypass valve 10 is also employed in a manner to prevent any withdrawal of gas through the auxiliary port 13. When the gas meter is connected to the gas service line to supply gas thereto, the auxiliary inlet disk is seated against the annular flow seat 38, thereby sealing off the auxiliary inlet as is shown in FIG. 3. Thus, even if an unauthorized person were to remove the threaded plug 14 in effort to withdraw gas through the side port, the poppet serves to effectively seal off the auxiliary inlet and will not permit any withdrawal of gas through such port. The threaded plug is, therefore, not required as gas is sealed against escape out the bypass valve through the auxiliary port. The plug is merely installed to seal the port from external contaminants.

Referring to FIG. 3, in normal operation, gas line pressure is applied to maintain the poppet 30 floated downstream and seated firmly against the seat 38 to thereby prevent shifting of such poppet within the cage, flutter or erratic movement which might otherwise contribute to wear of such poppet on the walls of such cage.

In operation, the bypass valve 10 is connected in line with the gas service line 16 by means of the externally threaded upstream flow inlet 28 and downstream flow outlet 26 being threadably coupled with corresponding internally threaded extremities on the gas service line 16 (FIGS. 3 and 4). The auxiliary port 13 is sealed during normal operation of the gas meter by means of the threaded plug 14, which engages the internally threaded flange 27 (FIGS. 1 and 3).

During normal operation, gas from the gas meter flows downstream through the gas service line 16 to the upstream inlet end 28 of the bypass valve 10 and through the primary inlet 62 to contact the primary inlet disk 44. The gas pressure applied to the primary inlet disk serves to drive the poppet toward the auxiliary inlet 60 of the poppet cage 40 which results in the auxiliary inlet disk 46 contacting and seating against the annular flow seat 38, thereby sealing off the auxiliary inlet. With the poppet driven against the annular flow seat 38 the cage outlets 32 are completely exposed to the gas contained in the poppet chamber. Such gas then flows radially out of the poppet chamber through the cage outlets and into the annular flow chamber (FIG. 5) to flow downstream through the flow chamber and out the downstream flow outlet 26 to the utilities of the corresponding building. Gas will continue to flow through the bypass valve in this manner while the gas meter is connected to the gas service line 16.

When it comes time to repair or replace the gas meter, the threaded plug 14 is unscrewed from the threaded flange 27, thereby exposing the auxiliary port 13. The threaded coupling 22 of the auxiliary source 56 may then be threadably engaged with the flange to create an auxiliary gas flow path from the auxiliary source to the auxiliary inlet 60. The auxiliary gas source may then be activated, thereby introducing auxiliary gas through the auxiliary port to flow upstream to the auxiliary inlet where it will contact the auxiliary inlet disk 46 seated against the annular flow seat 38. The pressure of such auxiliary gas flow may initially be increased to a pressure higher than the typical 0.25–5 psi of pressure typically maintained in the service line gas flow entering the primary inlet 62 from the gas meter. As such, the corresponding pressure applied to the auxiliary inlet disk will be greater than the pressure applied to the primary inlet disk, so that the pressure differential will act to drive the poppet toward the primary inlet 62 (FIG. 4). The primary inlet disk 44 is thus driven into contact with the annular auxiliary seat 34 to seat thereagainst to effectively seal off the flow inlet end 28 and thus seal off the gas service line from the gas meter. With the poppet seated against the annular auxiliary seat, the cage outlets 32 are completely exposed to the auxiliary gas flowing into the poppet chamber from the auxiliary source 56. Auxiliary gas will then flow into the chamber 48, radially outwardly through the exposed cage outlets 32, downstream through the flow chamber 42 and out the downstream flow outlet 26 to the gas distribution tubing of the corresponding building. The workman may then disconnect the gas meter 20 from the gas service lines 18 and 16 without concern for interruption in gas supply to the gas appliances.

When the gas meter has been repaired or replaced, the workman may then connect the repaired or replacement gas meter to the respective gas supply service lines 16 and 18 to initiate gas flow through the gas service line 16. The rate of gas flow supplied by the auxiliary gas source is then manually decreased to a pressure below that applied to the primary inlet disk 44 by the gas flowing from the gas meter to create a pressure differential across the poppet which acts to drive such poppet toward the auxiliary inlet 60 to resume its normal position seated against the annular flow seat 38. This serves to effectively seal off the auxiliary source 56 from the gas service line 16. Gas from the gas meter then flows into the poppet chamber 48, radially out through the cage outlets 32, downstream through the flow chamber and out the downstream flow outlet 26 to the gas appliances of the building. The workman may then unscrew the coupling 22 from the threaded flange 27 and replace the threaded plug 14 in such flange to effectively seal the auxiliary fitting thereby keeping external contaminants from entering the auxiliary fitting.

From the foregoing, it will be appreciated that the method of the present invention provides a continuous supply of gas to a residential or commercial building while the workperson undertakes to disconnect the gas meter from the gas service line leading to such building. The method is straightforward and does not require a time-consuming procedure to be followed in order to provide continuous gas supply to a residence or commercial building.

While a particular form of the invention has been illustrated and described, it will also be apparent that various modifications can be made without departing from the spirit and scope of the invention. Accordingly, it is not intended that the invention be limited, except as by the appended claims.

What is claimed is:

1. A method of servicing a gas meter connected between a supply line at a predetermined gas pressure and a distribution line, including:

selecting a bypass valve of the type having a main upstream end and a main downstream end, a flow chamber having confronting spaced apart upstream and downstream seats having a poppet cage therebetween to normally flow gas from said upstream end through a cage outlet in the side wall thereof to flow about said cage to said main downstream end, a floating poppet interposed between said seats and to shift therebetween and selectively seat thereon, and an auxiliary fitting having an auxiliary inlet port formed on a side wall of said valve and leading to an auxiliary inlet in said downstream seat;

inserting said bypass valve in said distribution line to connect said main upstream end with said meter and said main downstream end with said distribution line;

connecting an auxiliary gas source with said auxiliary inlet port;

raising the pressure of said auxiliary gas at said auxiliary inlet port above said predetermined pressure to drive said poppet in said cage into engagement with said upstream seat to seal off gas from said meter and flow gas from said auxiliary supply through said auxiliary fitting and out said cage outlet through said main downstream end; and while continuing the flow of gas from said auxiliary supply, uncoupling said distribution line from said meter to service said meter.

2. The method as recited in claim 1 wherein the step of selecting further includes:

selecting said bypass valve of the type having said poppet cage formed with a plurality of cage outlets in the side wall thereof.

3. The method of claim 1 wherein:

said step of inserting said bypass valve includes the step of threadably connecting said main upstream and downstream ends to said distribution line.

4. The method of claim 1 wherein the step of selecting further includes:

selecting said valve of the type including a poppet having predetermined dimensions for making a close sliding fit in said poppet cage.

5. The method of claim 1 wherein:

said step of connecting said auxiliary gas source to said auxiliary port includes the step of threadably connecting said gas source to said auxiliary port.

6. The method of claim 1 wherein:

said step of raising said gas pressure at said auxiliary inlet port includes raising said gas pressure to above 0.25 psi.

7. The method of claim 1 further including the steps of:

after servicing said meter, reconnecting said gas meter to said distribution line;

lowering said pressure at said auxiliary inlet port below said predetermined pressure to drive said poppet in said cage into engagement with said downstream seat to seal off gas from said auxiliary gas source and flow gas from said gas meter through said poppet cage and out said cage outlet through said main downstream end; and while continuing the flow of gas from said gas meter, disconnecting said auxiliary gas source from said auxiliary inlet port.

8. The method of claim 1 wherein:

said step of selecting said bypass valve includes selecting a valve of the type including a plastic, lightweight spool shaped valve formed on its upstream and downstream ends with circular poppet plates for seating on the respective said upstream and downstream seats.

9. A method of supplying uninterrupted gas flow to the gas distribution tubing of a building while the corresponding gas meter is replaced comprising the steps of:

selecting a bypass valve formed with an elongated, tubular, open ended housing defining a flow chamber therein and including an auxiliary port formed in the side wall thereof, said bypass valve further including an open ended poppet cage mounted in said flow chamber, said poppet cage including an annular flow seat formed at one end thereof and an annular auxiliary seat formed at the opposite end thereof, said poppet cage to be connected at said one end to said auxiliary port for the communication of gas flow from said auxiliary port into said poppet cage, said poppet cage further being formed with cage outlets in the walls thereof to allow for gas contained within said poppet cage to exit therefrom, said poppet cage housing a poppet having free axial movement therein;

connecting said bypass valve in line with a gas service line downstream of said gas meter;

connecting an auxiliary gas source to said auxiliary port;

initiating the flow of auxiliary gas through said auxiliary port, thereby driving said poppet against said auxiliary seat to seal said opposite end of said poppet cage while said auxiliary gas flows downstream to the appliances of said building;

disconnecting the gas meter from said gas service line;

connecting a new gas meter to said gas service line;

ceasing the flow of gas from said auxiliary gas source thereby driving said poppet within said poppet cage against said flow seat to seal said one end of said poppet cage to flow gas from said gas meter through said poppet cage and gas outlet downstream to said building; and disconnecting said auxiliary gas source from said auxiliary port.

10. The method of claim 9 wherein:

said step of connecting said bypass valve includes the step of threadably coupling said bypass valve with said gas service line.

11. The method of claim 9 wherein:

the step of selecting said bypass valve of the type including a poppet having predetermined dimensions for making a close sliding fit in said poppet cage.

12. The method of claim 9 wherein:

said step of connecting said auxiliary gas source to said auxiliary port includes the step' of threadably coupling said gas source to said auxiliary source.

* * * * *